(12) United States Patent
Hsu (10) Patent No.: US 11,543,598 B2
(45) Date of Patent: Jan. 3, 2023

(54) OPTICAL FIBER CONNECTOR

(71) Applicant: Gloriole Electroptic Technology Corp., Kaohsiung (TW)

(72) Inventor: Hsien-Hsin Hsu, Kaohsiung (TW)

(73) Assignee: Gloriole Electroptic Technology Corp., Kaohsiung (TW)

( * ) Notice: Subject to any disclaimer, the term of this patent is extended or adjusted under 35 U.S.C. 154(b) by 0 days.

(21) Appl. No.: 17/477,613

(22) Filed: Sep. 17, 2021

(65) Prior Publication Data

US 2022/0091343 A1 Mar. 24, 2022

(30) Foreign Application Priority Data

Sep. 23, 2020 (TW) ................................. 109212543

(51) Int. Cl.
*G02B 6/38* (2006.01)

(52) U.S. Cl.
CPC ......... *G02B 6/3825* (2013.01); *G02B 6/3831* (2013.01); *G02B 6/3874* (2013.01); *G02B 6/3893* (2013.01)

(58) Field of Classification Search
CPC .. G02B 6/3825; G02B 6/3831; G02B 6/3874; G02B 6/3893; G02B 6/3878
See application file for complete search history.

(56) References Cited

U.S. PATENT DOCUMENTS

| | | | | |
|---|---|---|---|---|
| 6,634,796 B2 * | 10/2003 | de Jong | ............... | G02B 6/3831 |
| | | | | 385/139 |
| 9,804,340 B1 * | 10/2017 | Lin | ...................... | G02B 6/3821 |
| 11,237,342 B2 * | 2/2022 | Iizumi | .................. | G02B 6/3878 |
| 11,454,766 B2 * | 9/2022 | Chang | .................. | G02B 6/3825 |
| 2018/0011254 A1 * | 1/2018 | Takano | ............... | G02B 6/3869 |
| 2018/0335577 A1 * | 11/2018 | Wong | ................... | G02B 6/3833 |
| 2019/0154922 A1 * | 5/2019 | Elenbaas | .............. | G02B 6/3878 |
| 2020/0150357 A1 * | 5/2020 | Higley | ................. | G02B 6/3893 |
| 2020/0166716 A1 * | 5/2020 | Chang | .................. | G02B 6/4292 |
| 2020/0271871 A1 * | 8/2020 | Bragg | .................. | G02B 6/3888 |
| 2020/0285001 A1 * | 9/2020 | Childers | .............. | G02B 6/3831 |
| 2021/0325614 A1 * | 10/2021 | Childers | .............. | G02B 6/3885 |
| 2022/0075126 A1 * | 3/2022 | Chang | .................. | G02B 6/3825 |

* cited by examiner

*Primary Examiner* — Ryan A Lepisto
*Assistant Examiner* — Erin D Chiem
(74) *Attorney, Agent, or Firm* — Blank Rome LLP (57) ABSTRACT

An optical fiber connector includes a casing body formed with upper and lower key slots, a polarity adjusting key detachably mounted in a selected one of the key slots and engaging an adaptor, head and tail sleeves disposed respectively on front and rear ends of the casing body, and two core heads disposed between the head sleeve and the casing body. To adjust the polarity of the optical fiber connector, the optical fiber connector is detached from the adaptor and the optical fiber connector is inverted. Then, the polarity adjusting key is operated to disengage from the selected one of the key slots and engage the other one of the key slots to adjust the polarity without removal of head and tail sleeves.

6 Claims, 9 Drawing Sheets

OPTICAL FIBER CONNECTOR

CROSS-REFERENCE TO RELATED APPLICATION

This application claims priority to Taiwanese Patent Application No. 109212543 filed on Sep. 23, 2020.

FIELD

The disclosure relates to a connector, more particularly to an optical fiber connector.

BACKGROUND

Figure 1:
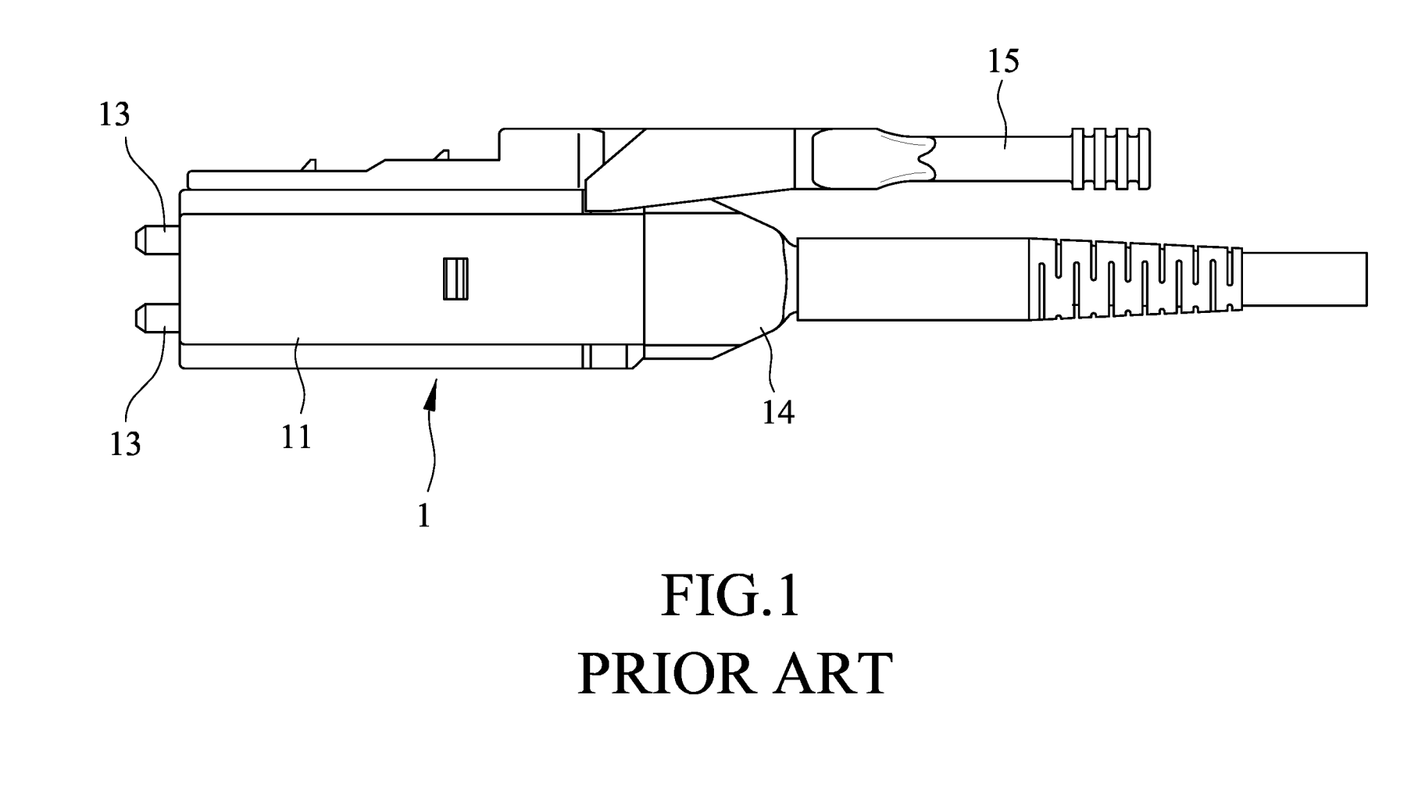
FIG. 1 is a schematic side view of a conventional optical fiber connector.
Figure 2:
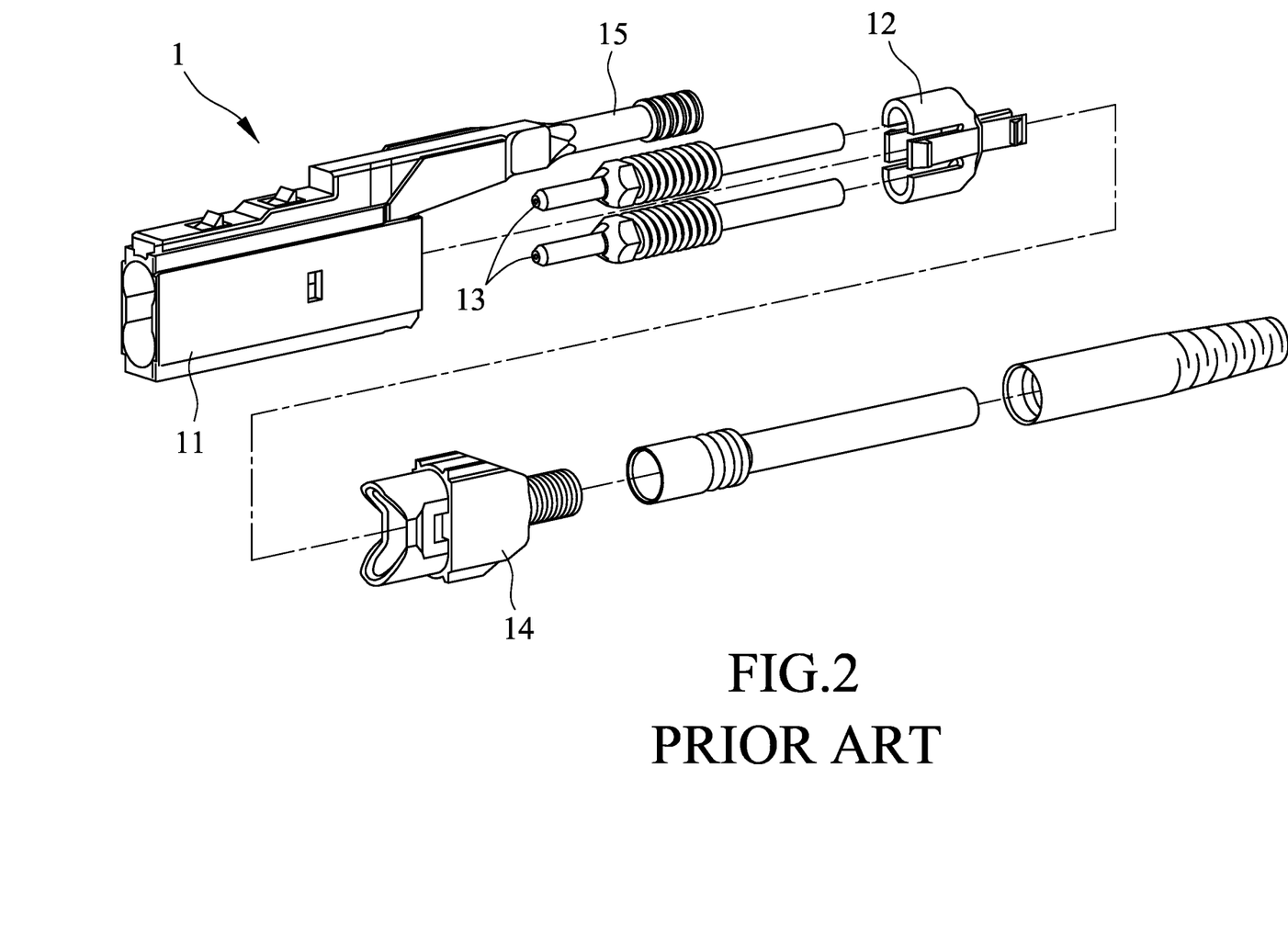
FIG. 2 is an exploded perspective view illustrating the structure of the conventional optical fiber connector shown in FIG. 1.

With continuous advancement of data transmission technology, new specifications, such as a four-channel quad small form-factor pluggable (QSFP) interface, for optical fiber connectors of high speed optical fibers are developed. Referring to FIGS. 1 and 2, a conventional optical fiber connector 1 includes a casing body 11, a head sleeve 12 disposed in the casing body 11, two core heads 13 mounted between the casing body 11 and the head sleeve 12 and arranged vertically spaced apart from each other, a tail sleeve 14 connected removably to a rear end of the casing body 11, and a handling lever 15 disposed on the casing body 11 and extending rearwardly. When the optical fiber connector 1 is to be connected to an adaptor or a socket (not shown), the casing body 11 is inserted into the adapter or the socket, and a front end of the handling lever 15 engages a corresponding slot of the adapter member or the socket, such that the core heads 13 are connected with another two core heads (not shown), respectively.

By virtue of various connecting sequences of the core heads 13, different matching manners may be obtained so as to achieve the effect of adjusting the polarity of the optical fiber connector and, thus realizing multiple connections. When adjusting the polarity of the conventional optical fiber connector 1, removal of the tail sleeve 14 from the casing body is required. Afterwards, the head sleeve 12 is detached from the casing body 11 and the core heads 13 are removed from the casing body 11 to exchange positions of the core heads 13. Then, the core heads 13 are mounted to the casing body 11 again. Thus, it is cumbersome to assemble and disassemble the conventional optical fiber connector. Further, during the assembly and disassembly procedures, the optical fibers in the tail sleeve 14 may be pulled and damaged.

SUMMARY

Therefore, an object of the disclosure is to provide an optical fiber connector that can alleviate at least the drawback of the prior art.

According to an aspect of the disclosure, an optical fiber connector is provided. The optical fiber connector extends along a front-rear direction and includes a casing body, a head sleeve, two core heads, a tail sleeve, and a polarity adjusting key.

The casing body has front and rear ends opposite to each other along the front-rear direction, includes a main body portion and two pairs of plate portions that are disposed respectively on opposite sides of the main body portion along a first direction transverse to the front-rear direction. Each pair of the plate portions are opposite to each other along a second direction transverse to the front-rear direction and the first direction, and define a key slot therebetween. Each of the plate portions of each pair of the plate portions is formed with an engaging hole extending along the second direction and in spatial communication with the key slot defined by a corresponding one pair of the plate portions. The head sleeve is disposed on the front end of the casing body. The core heads are disposed between the head sleeve and the casing body and are spaced apart from each other along the first direction. The tail sleeve is disposed on the rear end of the casing body along the front-rear direction. The polarity adjusting key is detachably disposed in a selected one of the key slots, and includes a connecting portion, a key portion, an anti-extraction portion, two operating portions and two engaging portions. The key portion extends forwardly from the connecting portion along the front-rear direction. The anti-extraction portion protrudes from a front end of the key portion along the first direction and is adapted to engage an adaptor. The operating portions extend rearwardly from the connecting portion along the front-rear direction and are spaced apart from each another along the second direction. The engaging portions protrude respectively and outwardly from the operating portions along the second direction and respectively engage the engaging holes. The operating portions are operable to move toward each other such that the engaging portions disengage respectively from the engaging holes, so as to allow removal of the polarity adjusting key from the selected one of the key slots.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
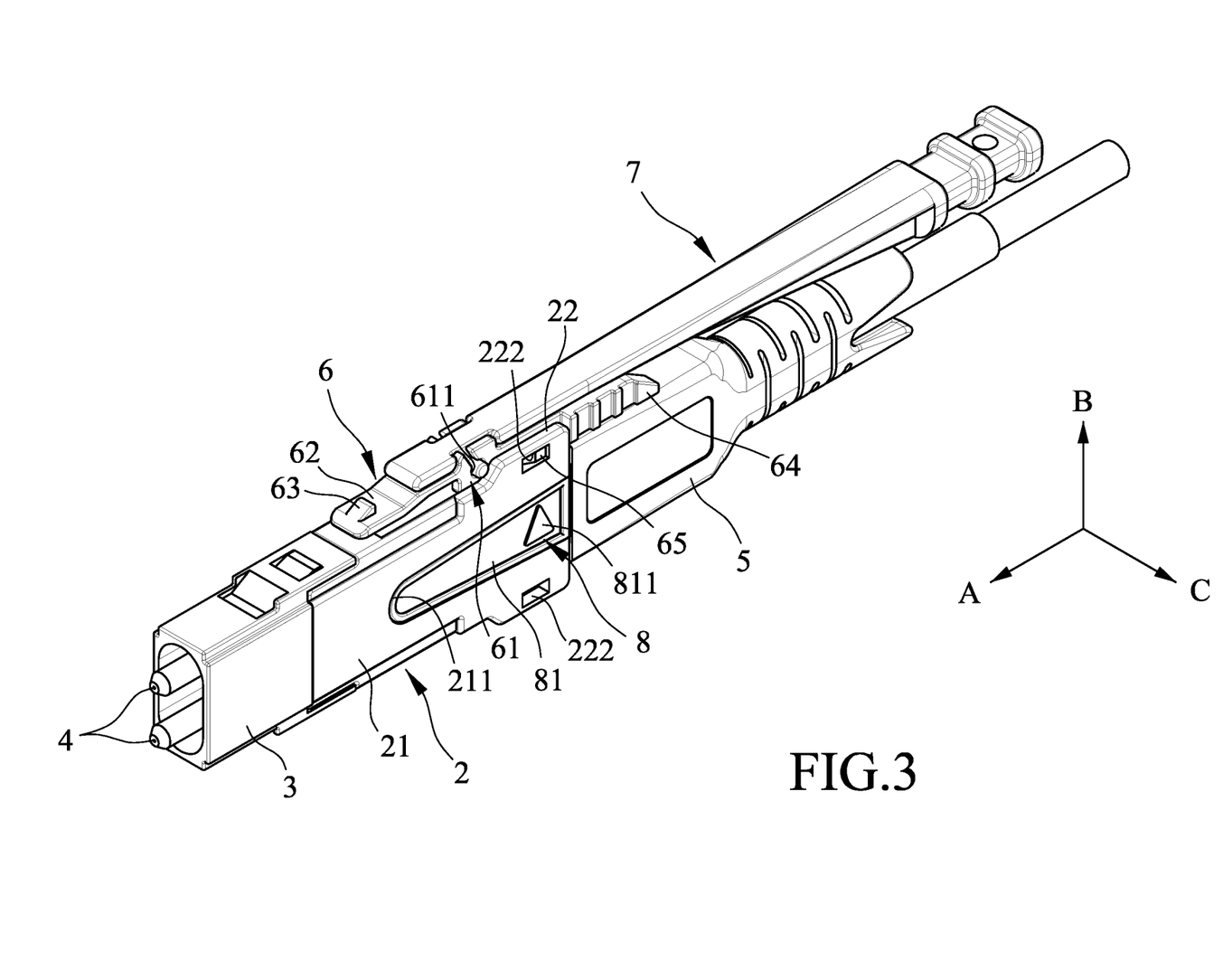
FIG. 3 is a perspective view of an optical fiber connector according to an embodiment of the present disclosure.
Figure 4:
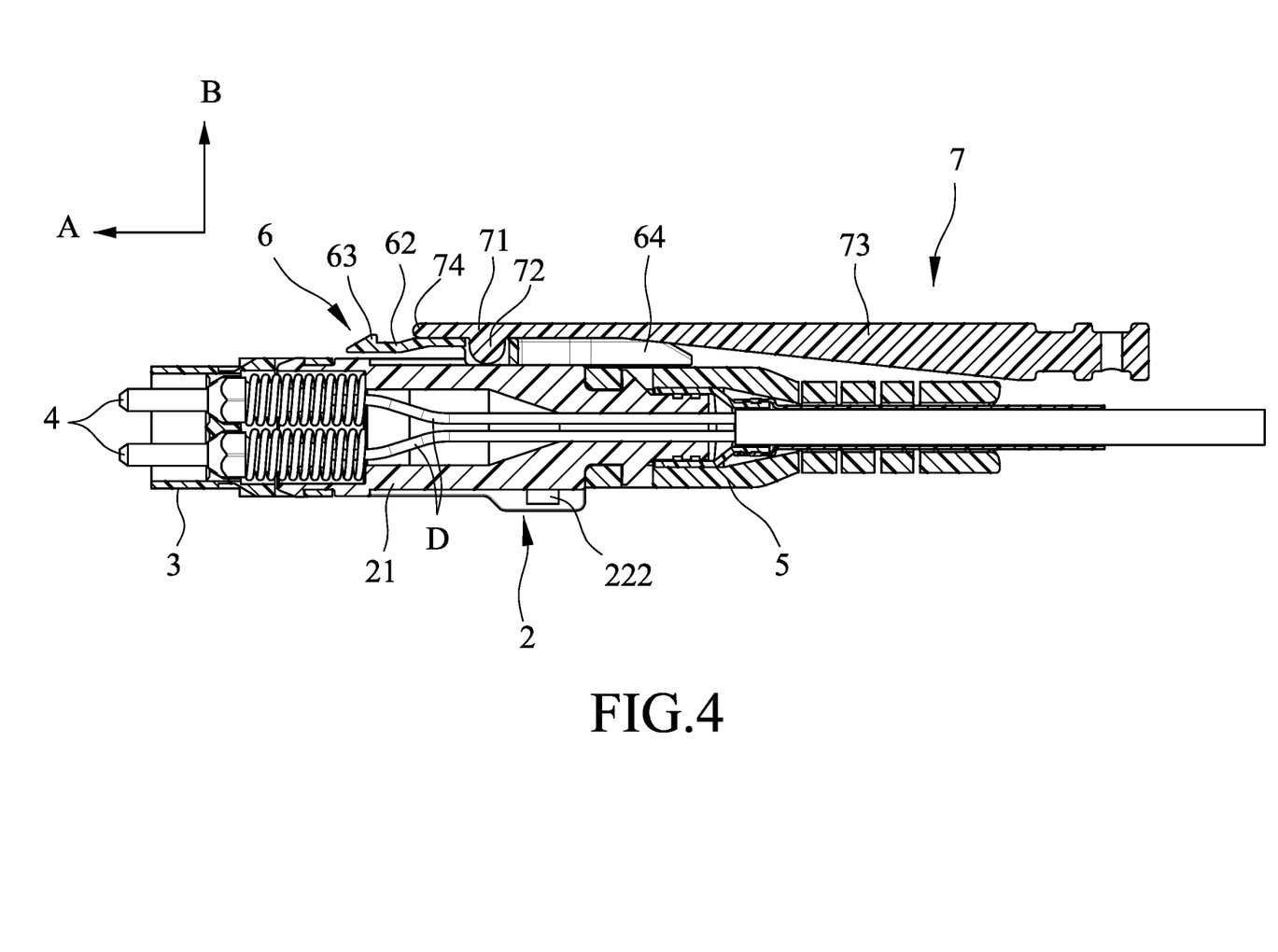
FIG. 4 is a schematic sectional view illustrating the embodiment of FIG. 3.
Figure 5:
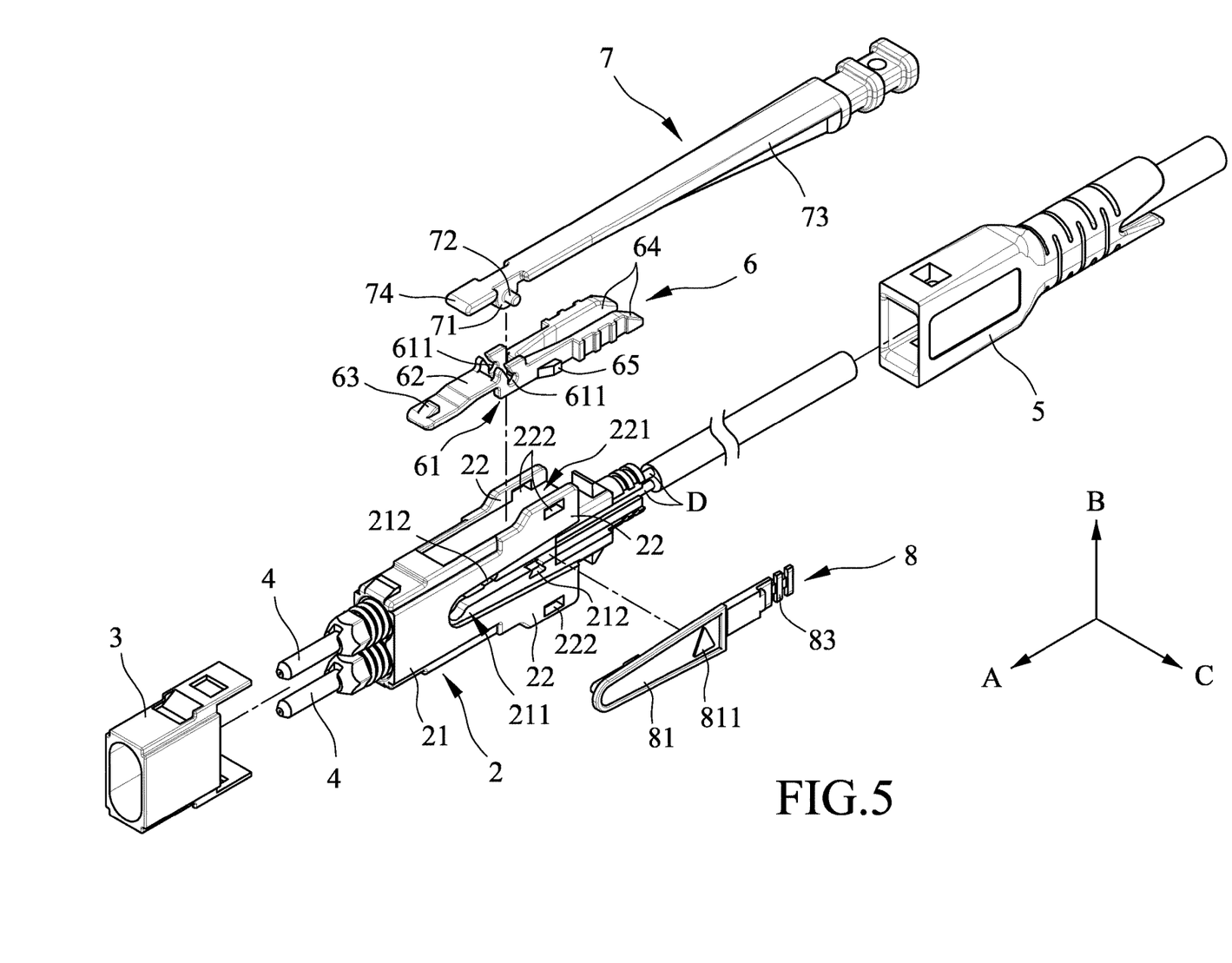
FIG. 5 is a partly exploded perspective view of the embodiment of FIG. 3, illustrating relationships among components of the embodiment.

Referring to FIGS. 3, 4, and 5, an embodiment of an optical fiber connector according to the present disclosure is shown.

The optical fiber connector extends along a front-rear direction (A) and includes a casing body 2 having front and rear ends opposite to each other along the front-rear direction (A), a head sleeve 3 disposed on the front end of the casing body 2, two core heads 4 disposed between the head sleeve 3 and the casing body 2 and being spaced apart from each other along a first direction (B) transverse to the first direction (A), an tail sleeve 5 disposed on the rear end of the casing body 2 along the front-rear direction (A), a polarity adjusting key 6 detachably disposed in a selected one of an upper side and a lower side of the casing body 2, a handling lever 7 pivotally connected to the polarity adjusting key 6, and an indicating member 8 detachably mounted to one side of the casing body 2. In this embodiment, the first direction (B) is an up-down direction.

The casing body 2 includes a main body portion 21, and two pairs of plate portions 22 that are opposite to each other along the first direction (B) and that are disposed respectively on opposite sides of the main body portion 21 along the first direction (B). The main body portion 21 is formed with an extending mounting slot 211, and a plurality of joining grooves 212 in spatial communication with the mounting slot 211 and spaced apart from one another other along the front-rear direction (A). In this embodiment, the number of the joining grooves 212 is two. Each pair of the plate portions 22 are opposite to each other along a second direction (C) transverse to the front-rear direction (A) and the first direction (B), and defining a key slot 221 therebetween. Each of the plate portions 22 of each pair of the plate portions 22 is formed with an engaging hole 222 extending along the second direction (C) and in spatial communication with the key slot 221 defined by a corresponding one pair of the plate portions 22.

The head sleeve 3 is detachably fixed to the front end of the casing body 2 by snap-fit connection. The core heads 4 are connected respectively to two optical fibers (D). In this embodiment, the core heads 4 are lucent connector (LC) ferrules.

The polarity adjusting key 6 includes a connecting portion 61 formed with two keyhole-shaped slots 611 that are spaced apart from each other along the second direction (C), a key portion 62 extending forwardly from the connecting portion 61 along the front-rear direction (A) and spaced apart from the main body portion 21 of the casing body 2, an anti-extraction portion 63 protruding from a front end of the key portion 62 along the first direction (B), two operating portions 64 extending rearwardly from the connecting portion 61 along the front-rear direction (A) and being spaced apart from each other along the second direction (C), and two engaging portions 65 (only one is visible) protruding respectively and outwardly from the operating portions 64 along the second direction (C) and respectively engaging the engaging holes 222 of one pair of the plate portions 22.

The operating portions 64 are operable to move toward each other along the second direction (C) such that the engaging portions 65 disengage respectively from the engaging holes 222, so as to allow removal of the polarity adjusting key 6 from the one of the key slots 221. The polarity adjusting key 6 can be disposed in the other one of the key slots 221 in a manner reverse to the abovementioned operation. The anti-extraction portion 63 of the polarity adjusting key 6 is adapted to engage an adaptor or a socket (not shown) so as to position the optical fiber connector on the adaptor or the socket.

Figure 6:
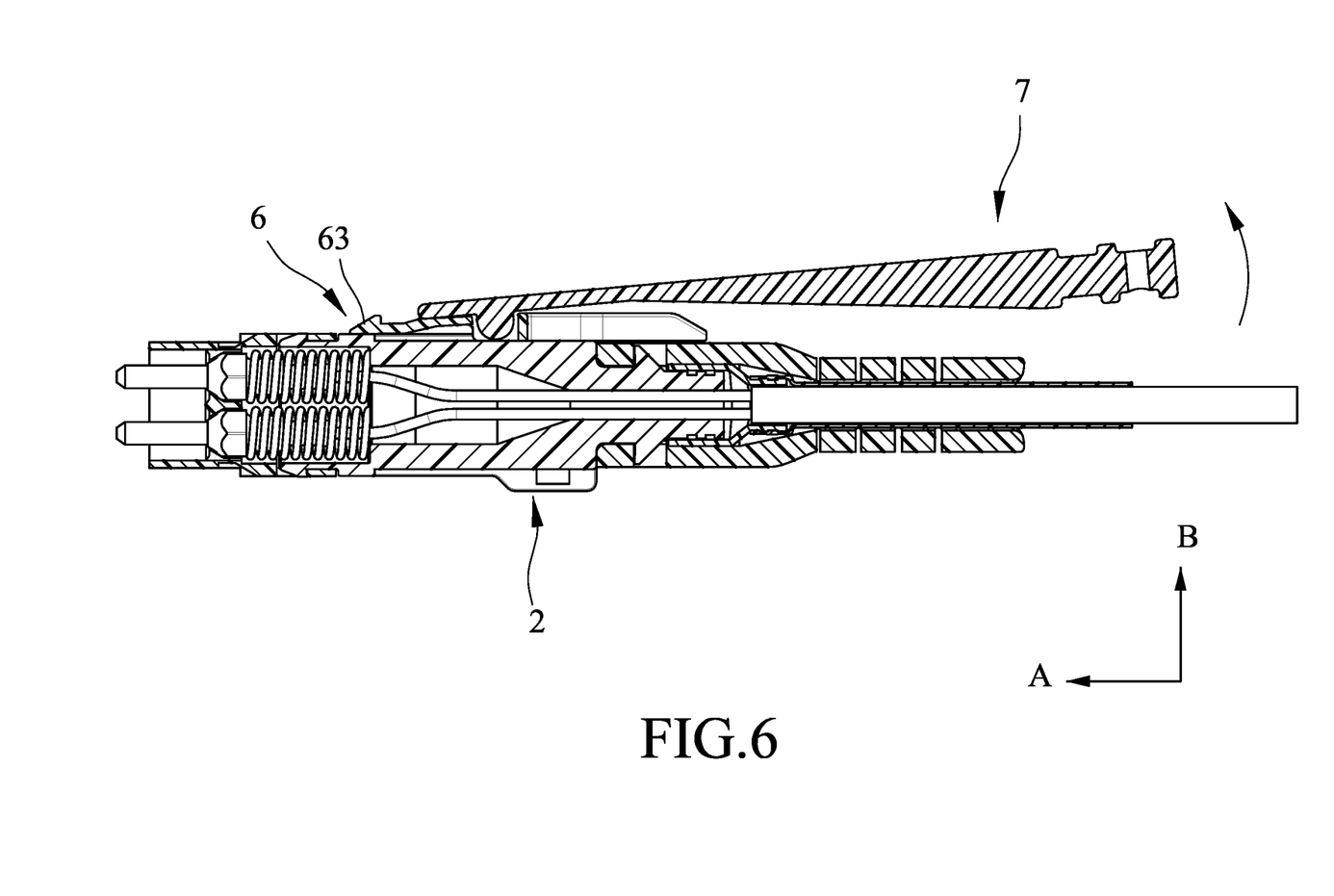
FIG. 6 is a schematic sectional view, illustrating a handling lever of the embodiment is pulled upwardly.

Referring to FIGS. 4, 5 and 6, the handing lever 7 extends along the front-rear direction (A) and includes a front portion that is pivotally connected to the connecting portion 61 of the polarity adjusting key 6, and a rear portion that is operable to be pulled away from the casing body 2 along the first direction (B) such that the handling lever (7) pivots relative to the polarity adjusting key 6 and the front portion of the handling lever 7 presses the key portion 62 of the polarity adjusting key 6 against the main body portion 21 of the casing body 2, so as to deform a front end of the polarity adjusting key 6, thereby allowing the anti-extraction portion 63 to disengage from the adaptor or the socket. In this embodiment, the handing lever 7 includes a received portion 71 that is received in the connecting portion 61 of the polarity adjusting key 6, two pivot pins 72 that extend from the received portion 71 away from each other along the second direction (C) and that engage respectively and are respectively pivotable within the keyhole-shaped slots 611, a pressing portion 74 that extends forwardly from the received portion 71, and a handle portion 73 that extends rearwardly from the received portion 71 and that constitutes the rear portion of the handling lever 7. The received portion 71, the pivot pins 72 and the pressing portion 74 constitute the front portion of the handling lever 7. When the handle portion 73 is operated to be pulled away from the casing body 2 along the first direction (B), the pivot pins 72 pivot respectively relative to the keyhole-shaped slots 611 and the pressing portion 74 presses against the key portion 62 of the polarity adjusting key 6 to deform the key portion 62, so that the anti-extraction portion 63 is movable toward the casing body 2 to allow disengagement from the adaptor or the socket.

Figure 7:
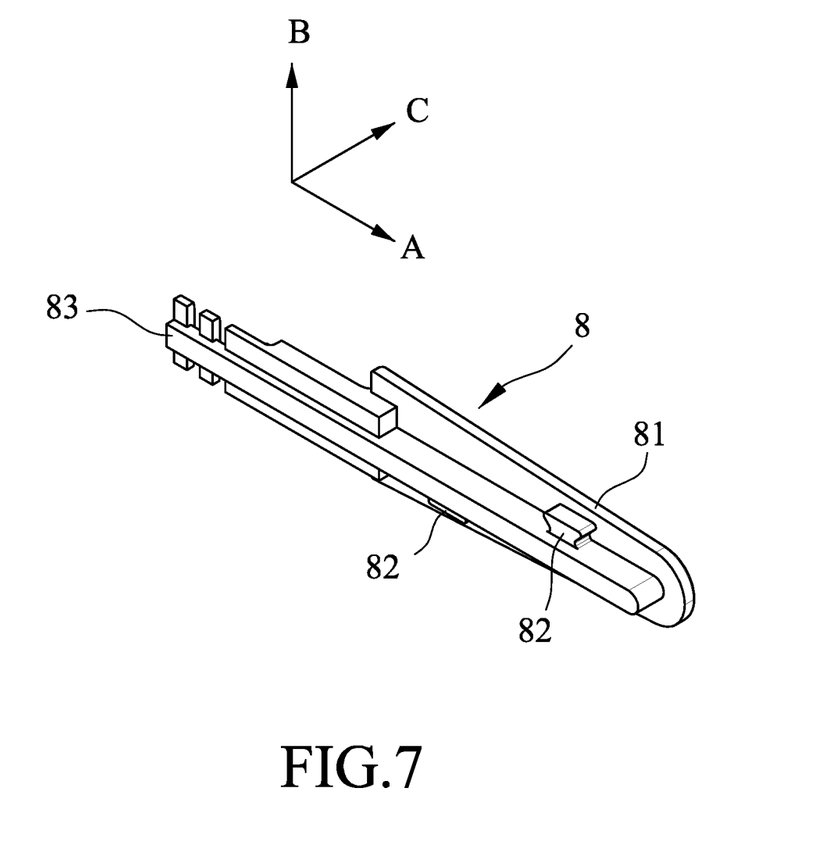
FIG. 7 is a perspective view of an indicating member of the embodiment.

Referring to FIGS. 3, 5, and 7, the indicating member 8 includes an elongated plate portion 81 extending along the front-rear direction (A), a plurality of joining portions 82 (see FIG. 7) extending from an inner surface of the plate portion 81 along the second direction (C) toward the casing body 2 and received respectively in the joining grooves 212, and an extending portion 83 extending rearwardly from the plate portion 81 into the tail sleeve 5. The plate portion 81 and the extending portion 83 are received in the extending slot 211. Note that the number of the joining portions 82 is the same as that of the joining grooves 212 and is also two in this embodiment.

The plate portion 81 has an outer side surface formed with a polarity-representing pattern 811 exposed outwardly and can be seen. In this embodiment, the polarity-representing pattern 811 is a triangle with a vertex pointing upwardly so that the polarity of the optical fiber connector can be realized. By virtue of the joining portions 82, the indicating member 8 can be mounted fixedly to the casing body 2.

Figure 8A:
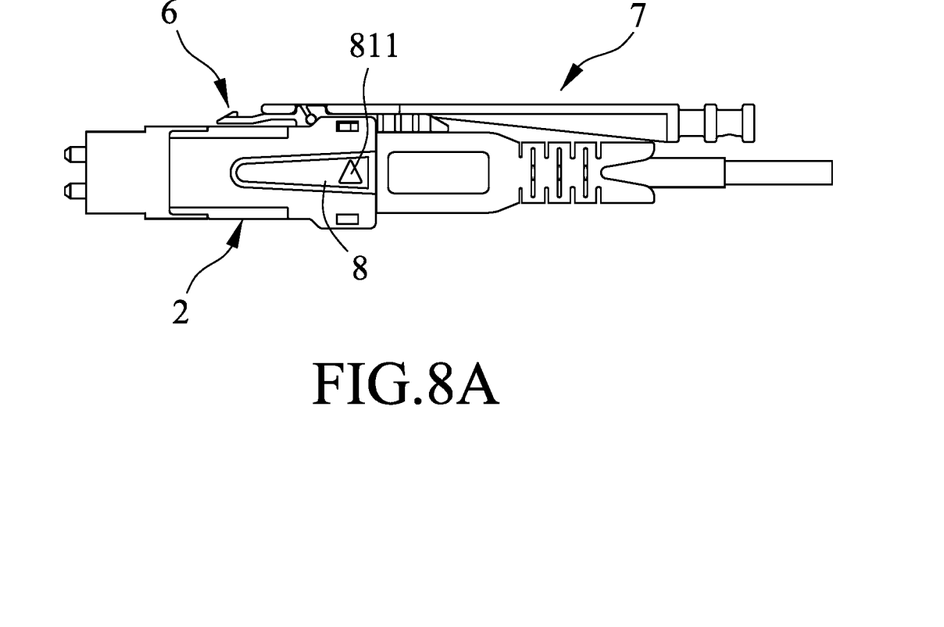
FIGS. 8A to 8D are schematic views of the embodiment, illustrating an operating procedure for adjusting the polarity of the optical fiber connector.
Figure 8B:
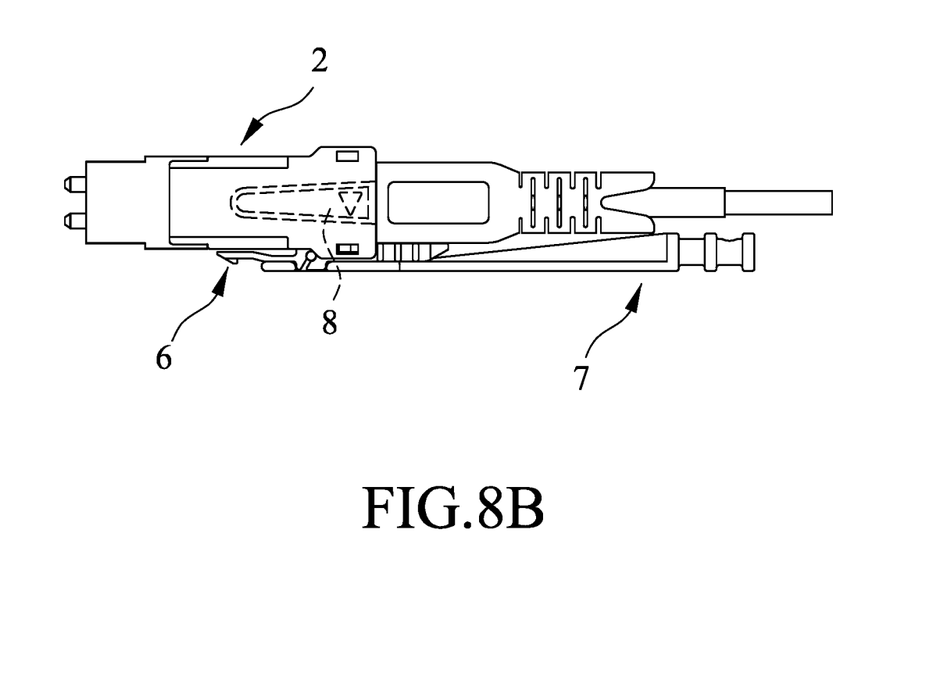
Figure 8C:
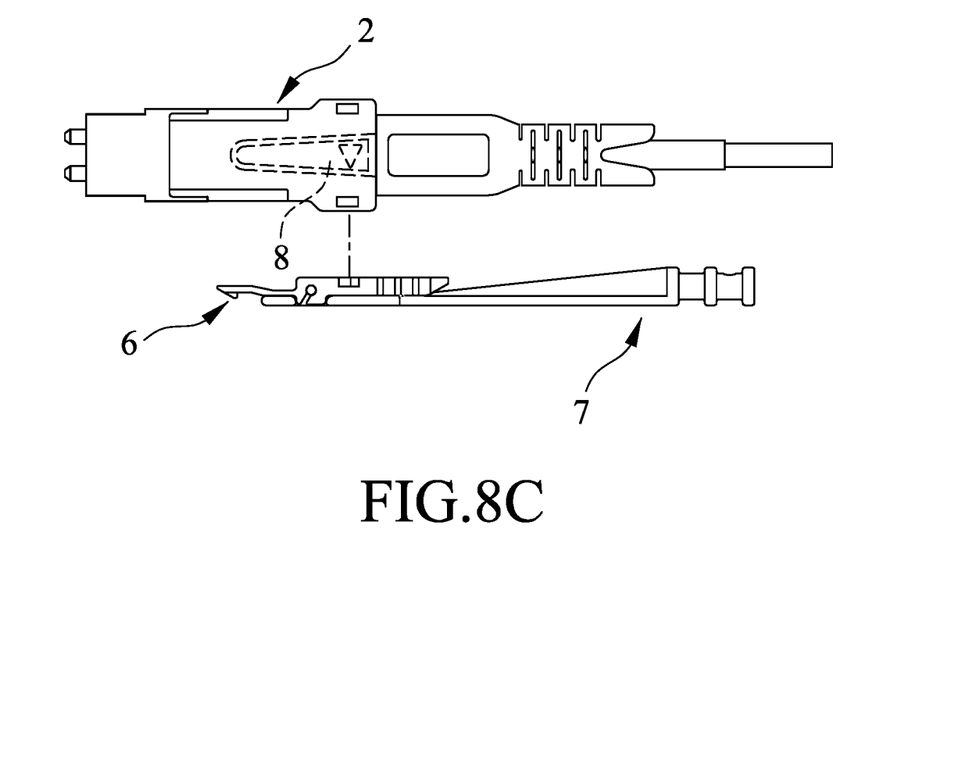
Figure 8D:
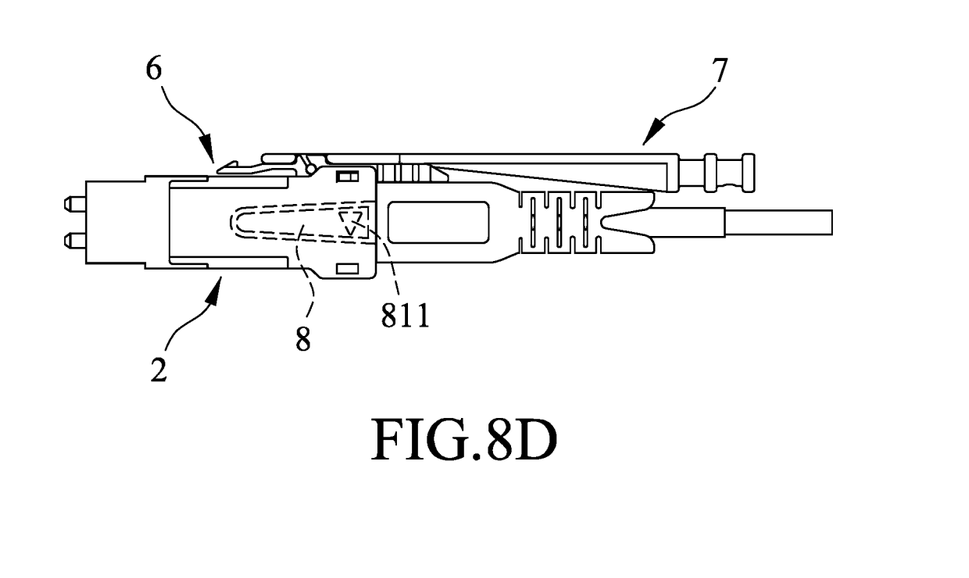

Referring to FIGS. 6 and 8A to 8D, to adjust the polarity of the optical fiber connector of this embodiment, the handling lever 7 is first pulled away from the casing body 2 (see FIG. 6) such that the anti-extraction portion 63 of the optical fiber connector disengages from the adaptor or the socket (not shown). As shown in FIGS. 8B and 8C, the optical fiber connector is inverted and then the polarity adjusting key 6 and the handling lever 7 are detached from the selected one of the key slots 221 of the casing body 2. Then, the polarity adjusting key 6 and the handling lever 7 are engaged into the other one of the key slots 221, which is the lower one of the key slots 211 in FIG. 8A. Finally, the optical fiber connector is brought to engage the adaptor or the socket. As can be seen in FIG. 8D, the vertex of the polarity-representing pattern 811 points downwardly to indicate the polarity of the optical fiber connector is different from that shown in FIG. 8A.

To sum up, by virtue of the configuration of the embodiment of the optical fiber connector according to the present disclosure, it is simple and fast to adjust the polarity of the optical fiber connector. Further, when assembling and disassembling the optical fiber connector, removal of the tail sleeve 5 is not required and thus the optical fibers (D) connected to the core heads 4 of the optical fiber connector would not be damaged, which may affect optical performance. Additionally, the core heads 4, which are LC ferrules, can be connected to a four-channel quad small form-factor pluggable (QSFP) interface to provide high speed transmission.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector extending along a front-rear direction, comprising:
    a casing body having front and rear ends opposite to each other along the front-rear direction, including a main body portion and two pairs of plate portions that are disposed respectively on opposite sides of said main body portion along a first direction transverse to the front-rear direction, each pair of said plate portions being opposite to each other along a second direction transverse to the front-rear direction and the first direction, and defining a key slot therebetween, each of said plate portions of each pair of said plate portions being formed with an engaging hole extending along the second direction and in spatial communication with said key slot defined by a corresponding one pair of said plate portions;
    a head sleeve disposed on said front end of said casing body;
    two core heads disposed between said head sleeve and said casing body and being spaced apart from each other along the first direction;
    a tail sleeve disposed on said rear end of said casing body along the front-rear direction; and
    a polarity adjusting key detachably disposed in a selected one of said key slots, and including a connecting portion, a key portion extending forwardly from said connecting portion along the front-rear direction, an anti-extraction portion protruding from a front end of said key portion along the first direction and adapted to engage an adaptor, two operating portions extending rearwardly from said connecting portion along the front-rear direction and being spaced apart from each other along the second direction, and two engaging portions protruding respectively and outwardly from said operating portions along the second direction and respectively engaging said engaging holes, said operating portions being operable to move toward each other such that said engaging portions disengage respectively from said engaging holes, so as to allow removal of said polarity adjusting key from the selected one of said key slots.

2. The optical fiber connector as claimed in claim 1, wherein said key portion of said polarity adjusting key is spaced apart from said main body portion of said casing body, said optical fiber connector further comprising a handling lever extending along the front-rear direction, including a front portion that is pivotally connected to said connecting portion of said polarity adjusting key, and a rear portion that is operable to be pulled away from said casing body along the first direction such that said handling lever pivots relative to said polarity adjusting key and said front portion of said handling lever presses said key portion of said polarity adjusting key against said main body portion of said casing body, so as to deform a front end of said polarity adjusting key, thereby allowing said anti-extraction portion to disengage from the adaptor.

3. The optical fiber connector as claimed in claim 2, wherein said connecting portion of said polarity adjusting key is formed with two keyhole-shaped slots spaced apart from each other along the second direction, said handing lever including a received portion that is received in said connecting portion of said polarity adjusting key, two pivot pins that extend from said received portion away from each other along the second direction and that engage respectively and are respectively pivotable within said keyhole-shaped slots, a handle portion that extends rearwardly from said received portion and that constitutes the rear portion of said handling lever, and a pressing portion that extends forwardly from said received portion, such that, when said handle portion is operated to be pulled away from said casing body, said pressing portion presses against said key portion of said polarity adjusting key to deform said key portion, so that said anti-extraction portion is movable toward said casing body to allow for disengagement from the adaptor.

4. The optical fiber connector as claimed in claim 1, further comprising an indicating member detachably mounted to one side of said casing body, and including a polarity-representing pattern.

5. The optical fiber connector as claimed in claim 4, wherein said indicating member further includes an elongated plate portion extending along the front-rear direction and having an outer side surface formed with said polarity-representing pattern, a plurality of joining portions extending from an inner surface of said plate portion along the second direction toward said casing body, and an extending portion extending rearwardly from said plate portion into said tail sleeve, said main body portion of said casing body being formed with a plurality of joining grooves receiving respectively said joining portions of said indicating member, an extending slot receiving said plate portion and said extending portion of said indicating member.

6. The optical fiber connector as claimed in claim 1, wherein said core heads are LC ferrules.

* * * * *